(12) United States Patent
Jarrin et al.

(10) Patent No.: US 10,562,425 B2
(45) Date of Patent: Feb. 18, 2020

(54) ADJUSTMENT DEVICE FOR A HEADREST OF A VEHICLE SEAT

(71) Applicant: FAURECIA AUTOSITZE GMBH, Stadthagen (DE)

(72) Inventors: Clément Jarrin, Ismaning (DE); Hervé Bulle, Magny-Vernois (FR); Tomasz Kowalski, Walbrzych (PL); Rainer Hagemann, Obernkirchen (DE)

(73) Assignee: FAURECIA AUTOSITZE GMBH, Stadthagen (DE)

( * ) Notice: Subject to any disclaimer, the term of this patent is extended or adjusted under 35 U.S.C. 154(b) by 62 days.

(21) Appl. No.: 15/910,047

(22) Filed: Mar. 2, 2018

(65) Prior Publication Data

US 2018/0257531 A1     Sep. 13, 2018

(30) Foreign Application Priority Data

Mar. 7, 2017 (DE) .................... 10 2017 104 761

(51) Int. Cl.
| | |
|---|---|
| *B60N 2/815* | (2018.01) |
| *B60N 2/865* | (2018.01) |
| *B60N 2/824* | (2018.01) |
| *B60N 2/85* | (2018.01) |
| *B60N 2/844* | (2018.01) |
| *B60N 2/818* | (2018.01) |

(52) U.S. Cl.
CPC ............ *B60N 2/815* (2018.02); *B60N 2/818* (2018.02); *B60N 2/824* (2018.02); *B60N 2/844* (2018.02); *B60N 2/85* (2018.02); *B60N 2/865* (2018.02)

(58) Field of Classification Search
None
See application file for complete search history.

(56) References Cited

U.S. PATENT DOCUMENTS

| | | | | |
|---|---|---|---|---|
| 10,427,573 | B2 * | 10/2019 | Ishihara | B60N 2/865 |
| 2006/0250017 | A1 * | 11/2006 | Otto | B60N 2/888 |
| | | | | 297/410 |
| 2009/0058162 | A1 * | 3/2009 | Boes | B60N 2/888 |
| | | | | 297/406 |
| 2014/0210245 | A1 * | 7/2014 | Tobata | B60N 2/847 |
| | | | | 297/408 |
| 2015/0239378 | A1 * | 8/2015 | Ishihara | B60N 2/815 |
| | | | | 297/391 |
| 2015/0251574 | A1 * | 9/2015 | Ishihara | B60N 2/862 |
| | | | | 297/391 |
| 2015/0251577 | A1 * | 9/2015 | Ishihara | B60N 2/4228 |
| | | | | 297/216.12 |
| 2015/0258924 | A1 * | 9/2015 | Ishihara | B60N 2/4228 |
| | | | | 297/216.12 |
| 2015/0329023 | A1 * | 11/2015 | Ishihara | B60N 2/865 |
| | | | | 297/406 |
| 2015/0352989 | A1 * | 12/2015 | Ishihara | B60N 2/865 |
| | | | | 297/406 |
| 2017/0113582 | A1 * | 4/2017 | Michalak | B60N 2/809 |

* cited by examiner

*Primary Examiner* — David E Allred
(74) *Attorney, Agent, or Firm* — Barnes & Thornburg LLP (57) ABSTRACT

An adjusting apparatus for adjusting a vehicle seat component of a vehicle seat comprises an adjustment arrangement for adjusting the vehicle seat component and a locking device. The locking device is coupled to the adjustment arrangement to block movement of the vehicle seat component in a locking position.

11 Claims, 8 Drawing Sheets

ADJUSTMENT DEVICE FOR A HEADREST OF A VEHICLE SEAT

PRIORITY CLAIM

This application claims priority to German Patent Application No. DE 10 2017 104 761.1, filed Mar. 7, 2017, which is expressly incorporated by reference herein.

BACKGROUND

The present disclosure relates to an occupant support, and particularly to an occupant support used in a vehicle. More particularly, the present disclosure relates to an adjusting device for a vehicle seat.

SUMMARY

According to the present disclosure, a vehicle seat includes a backrest and a headrest. The headrest is coupled to the backrest by an adjusting apparatus that is configured to allow movement of the headrest relative to the backrest of the vehicle seat.

In illustrative embodiments, the adjusting apparatus allows adjustment of the headrest in the X direction, that is to say the longitudinal direction, and the Z direction, that is to say the vertical direction, at the same time. The adjusting apparatus includes a guide device on which the headrest is held by way of a headrest support and a locking device. The guide device may be pivoted in relation to the backrest by means of a four-joint mechanism which has a relatively long rear link and a relatively short front link. The locking device locks the headrest in a fixed position relative to the backrest.

A single handle is provided on the locking device so that a user may pivot the handle to move the adjusting apparatus to an unlocking position so that the headrest may be adjusted simultaneously in the X and Z directions. The handle may also be readily reached by the user, for example using a hand directly next to the user's head.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIGS. 1a)-1d) show a backrest comprising a headrest and an adjusting apparatus for adjusting the headrest according to one embodiment of the disclosure;

FIGS. 2a)-2b) are a series of perspective views of the adjusting apparatus;

FIGS. 6a) and 6b) are a series of perspective views of the locking element;

DETAILED DESCRIPTION

Figure 1A:
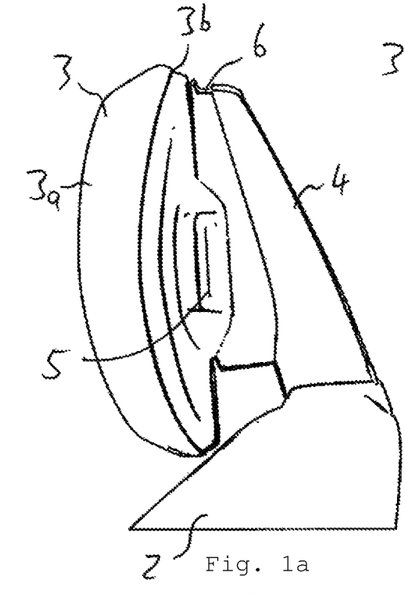
FIG. 1a) shows the headrest in the frontmost and bottommost (MaxX/MinZ) position.
Figure 1B:
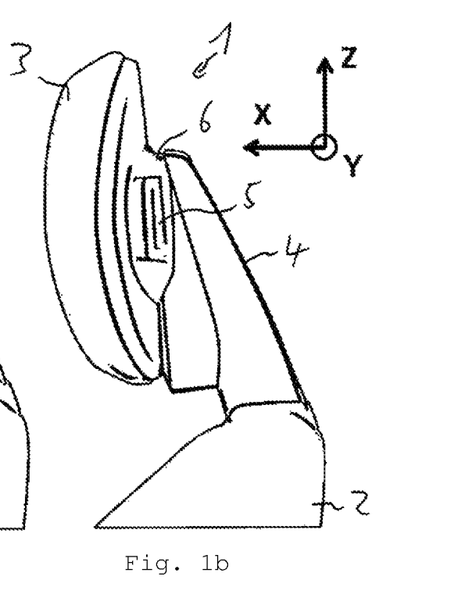
FIG. 1b) shows the headrest in the frontmost and topmost (MaxX/MaxZ) position.
Figure 1C:
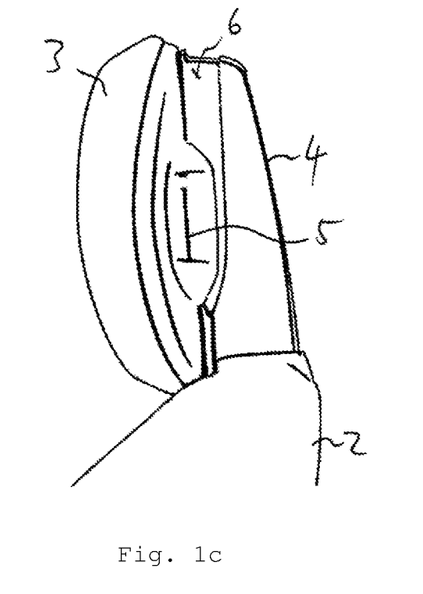
FIG. 1c) shows the headrest in the rearmost and bottommost (MinX/MinZ) position.
Figure 1D:
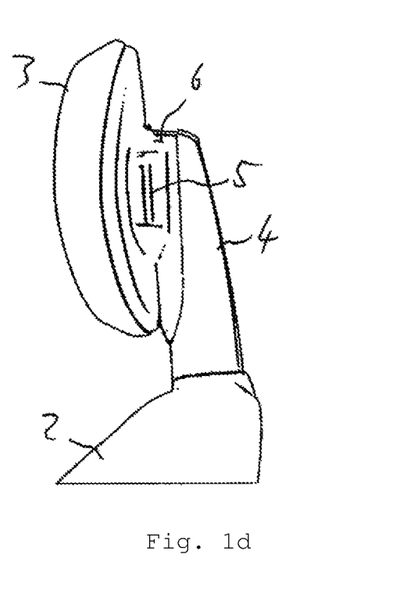
FIG. 1d) shows the headrest in the rearmost and topmost (MinX/MaxZ) position.
Figure 2A:
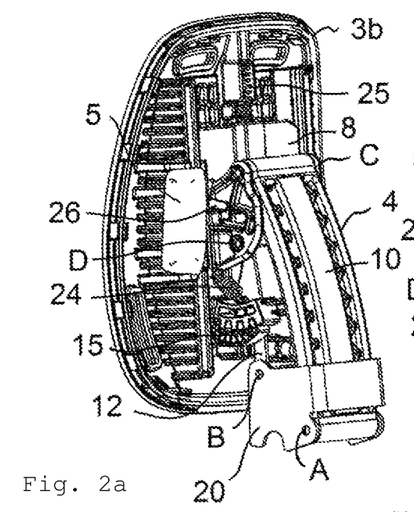
FIG. 2a) is a perspective view of the adjusting apparatus in the rearmost and central vertical (MinX/MidZ) position of the cushion support.
Figure 2B:
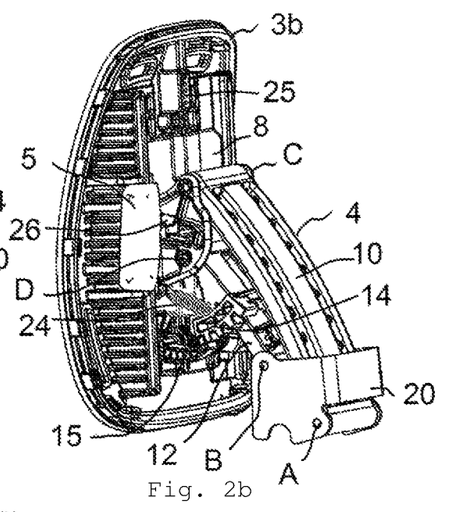
FIG. 2b) is a perspective view of the adjusting apparatus in the frontmost and central vertical (MaxX/MidZ) position of the cushion support.
Figure 2C:
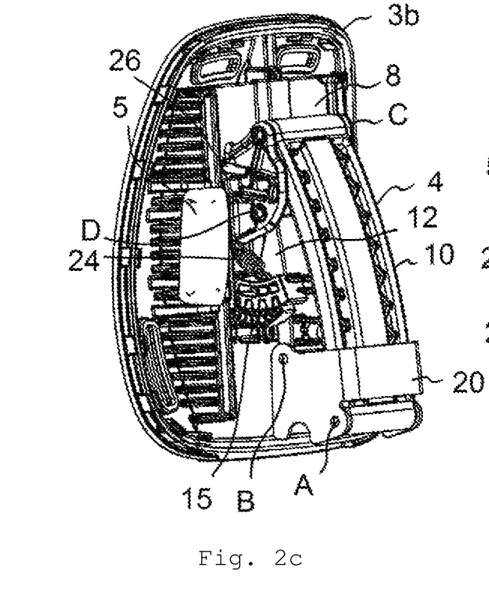
FIG. 2c) is a perspective view of the adjusting apparatus in the rearmost and bottommost (MinX/MinZ) position of the cushion support.
Figure 2D:
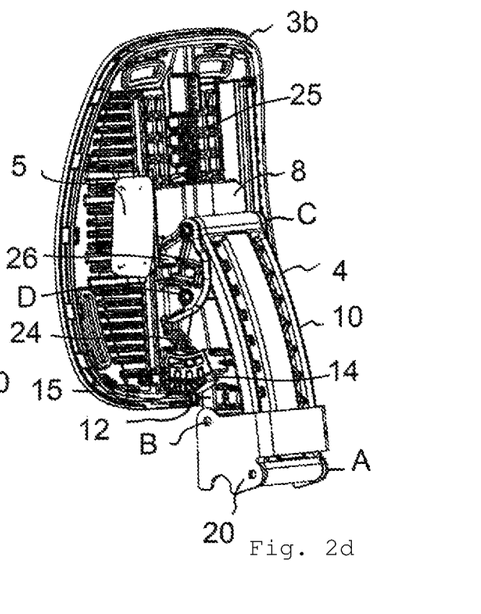
FIG. 2d) is a perspective view of the adjusting apparatus in the rearmost and topmost (MinX/MaxZ) position of the cushion support.

A vehicle seat 1 in each case has a backrest 2 and a headrest 3, wherein the headrest 3 is attached to the backrest 2 by means of an adjusting apparatus 4 which allows adjustment of the headrest 3 in the X direction, that is to say the longitudinal direction, and the Z direction, that is to say the vertical direction. Here, the respective end positions, that is to say in the frontmost and rearmost and also respectively topmost and bottommost positions, are shown in FIGS. 1a) to 1d). For adjustment purposes the user grasps—here, for example, using his left hand, possibly also using his right hand instead of or in addition—a handle 5 of the adjusting apparatus and operates said adjusting apparatus so that the headrest 3 may subsequently be adjusted in the two degrees of freedom within the stops.

The individual inner elements or the adjusting mechanism of the adjusting apparatus 4 may not be visible to the vehicle occupant from the outside, for which purpose, for example, a cover 6 is also provided in one piece or else in several pieces, which cover adjoins a headrest cushion 3a of the headrest 3, for example, in a flush manner toward the front and which cover may adjoin the backrest 2 toward the rear and bottom, wherein the handle 5 protrudes outward or else may also be covered by the cover 6. The entire vehicle seat 1 together with the adjusting apparatus 4 provides a design impression toward the outside, without, for example, exposing adjusting mechanisms with adjustable mechanical parts which, furthermore, also entails the risk of, for example, jamming or parts stopping and dirt settling in a mechanism.

Furthermore, the adjusting apparatus 4 is of relatively small construction, in spite of the high degree of adjustability and functionality which it ensures, so that the vehicle seat is not bulky in its upper region comprising the headrest and the adjusting apparatus, but rather is of relatively narrow construction. As a result, of this the headrest may meet design standards and also may permit free configuration of the upper backrest region of the backrest 2 and also of the headrest 3.

According to the illustrative embodiment, a single handle 5 is provided for adjusting the headrest 3 both in the Z direction and in the X direction, so that operator control by the user is also simple since said user merely has to operate the handle 5 and may then freely adjust the headrest 3 in the two degrees of freedom. The handle 5 may also be readily reached by the user, for example using a hand directly next to his head, so that he does not have to operate, for example, an operating device on the rear side of the headrest 3 or of the adjusting apparatus 4.

Figure 4:
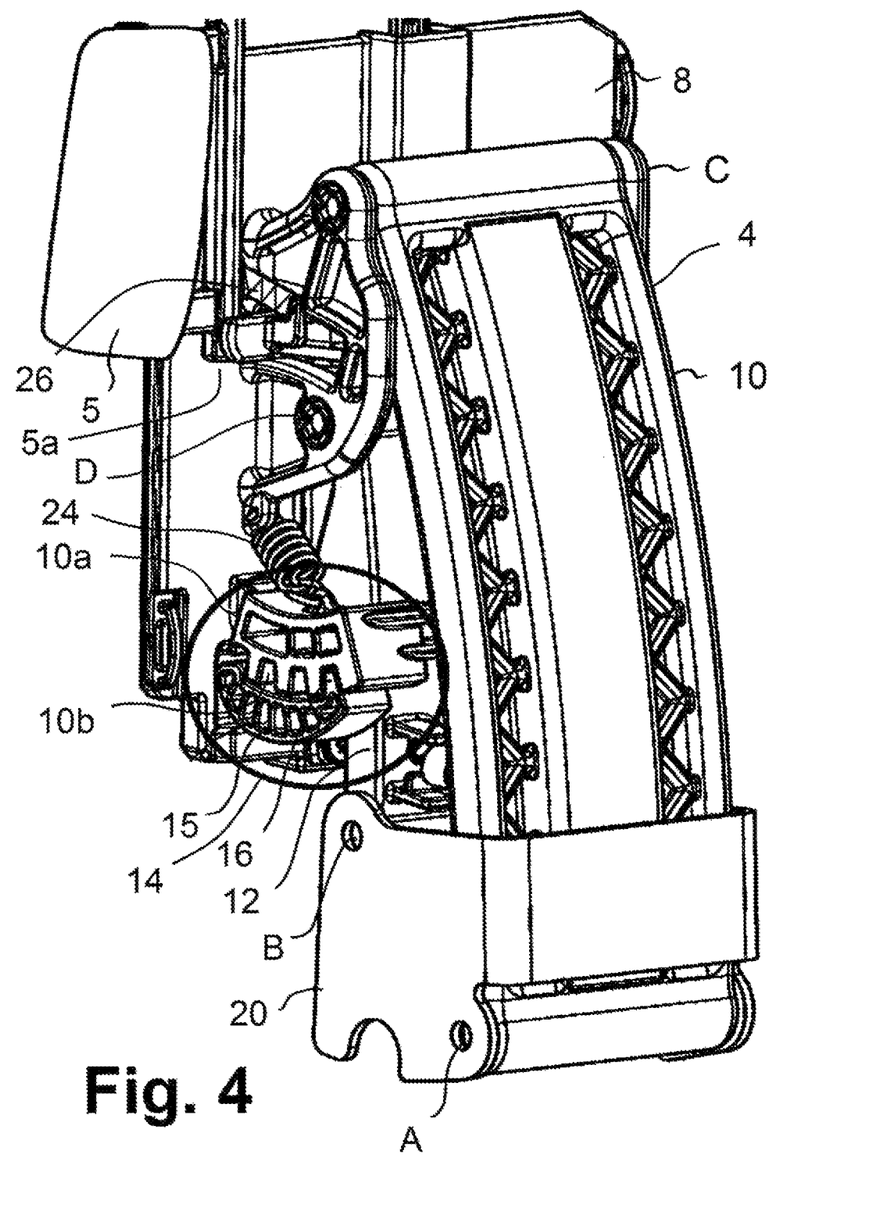
FIG. 4 is an enlarged perspective rear view of a portion of the adjusting apparatus of FIG. 1.
Figure 5:
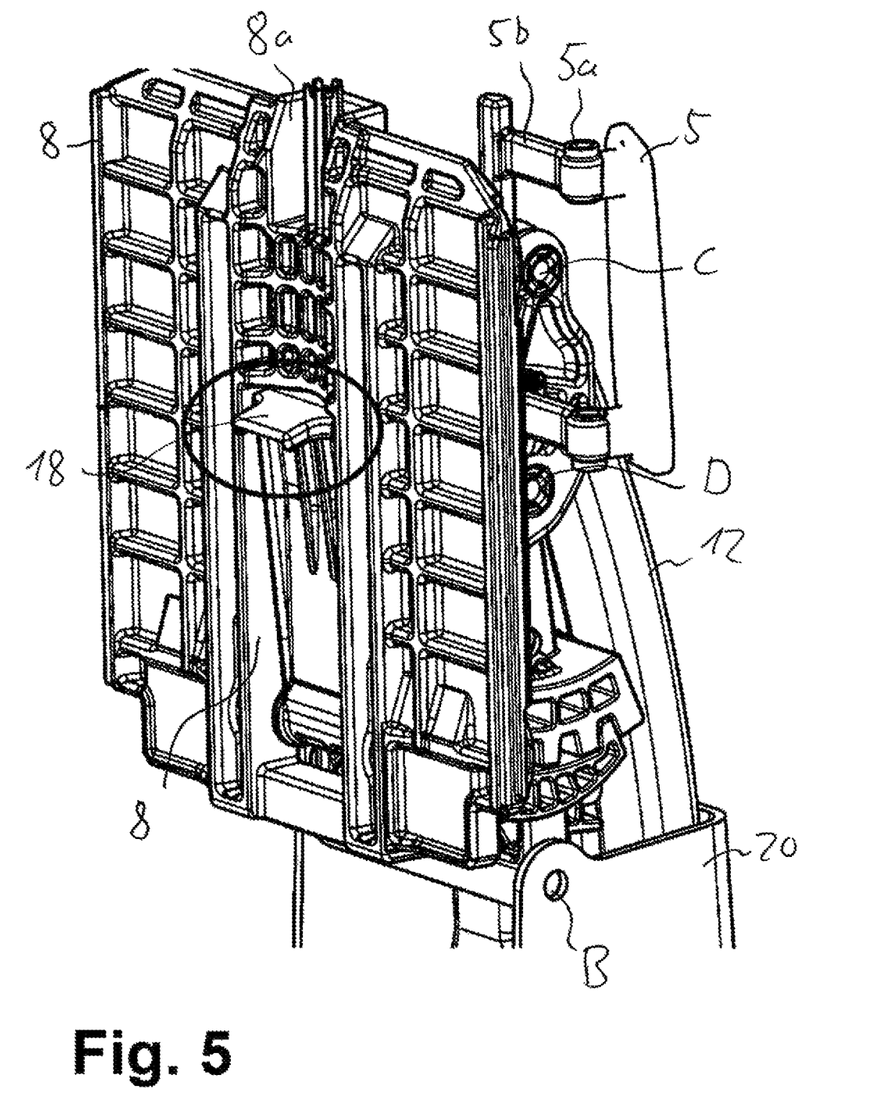
FIG. 5 is another perspective view of a portion of the adjusting apparatus.

As shown in FIGS. 2, 4 and 5, the adjusting apparatus 4 includes a guide device 8 on which the headrest 3 is held by way of its headrest support 3b, which holds the headrest cushion 3a, in a vertically adjustable manner, that is to say such that it may be adjusted in the Z direction.

The guide device 8 may be pivoted in relation to the backrest 2 by means of a four-joint mechanism 9 which has a relatively long rear link 10 and a relatively short front link 12. The rear link 10 is connected in an articulated manner to a backrest connection 20 in a rear lower joint A and to the guide device 8 in a rear upper joint C. Accordingly, the relatively short front link 12 is pivotably connected in an articulated manner to the backrest connection 20 in a front lower joint B and to the guide device 8 in a front upper link D. The backrest connection 20 is mounted on the backrest 2.

Figure 3A:
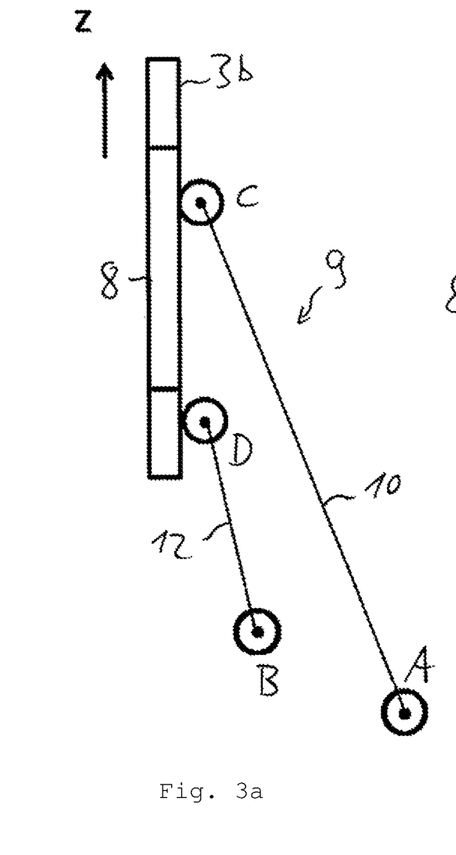
FIG. 3a-3b are a series of diagrammatic views showing the adjusting apparatus in the various positions.
Figure 3B:
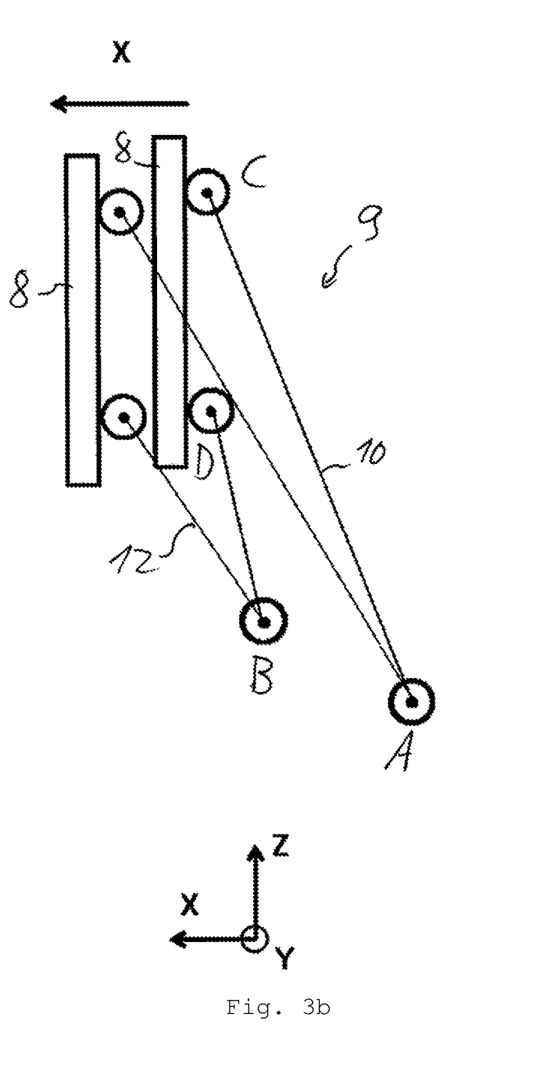

As shown in FIG. 3, a four-joint mechanism 9 for adjusting the guide device 8 in relation to the backrest 2 is formed. This four-joint mechanism 9 may not be designed in the form of a parallelogram guide, but rather with a relatively long rear link 10 and a relatively short front link 12, which links—as shown in FIG. 3a and FIG. 3b in particular—therefore, at least in most positions, do not run in parallel either, but rather perform somewhat different pivot movements.

According to the illustrative embodiment, the rear lower joint A is provided behind and below the rear front joint B and furthermore the rear upper joint C is provided above the front upper joint D, so that a corresponding rear link 10 is longer than the front link 12. Here, a slim design with a great longitudinal extent or vertical extent of the four-joint mechanism 9 may be provided, and furthermore also a high degree of stability and stiffness may be achieved. It may not be possible to achieve this, for example, with a parallelogram design in which the lower joints A, B and accordingly the upper joints C, D are arranged vertically one above the other. Therefore, rattling may be more effectively suppressed and a high degree of stiffness may be achieved in comparison to a parallelogram design. The adjustment kinematics in the X direction according to FIG. 3b, in addition to the pure X adjustment, may lead to a slight pivoting movement which, in the event of forward pivoting, pivots the guide device 8 somewhat downward too. However, since the user may adjust the headrest of the vehicle 8 in the X and Z direction at the same time after unlocking, this pivoting movement may not be uncomfortable.

Figures 6A, 6B:
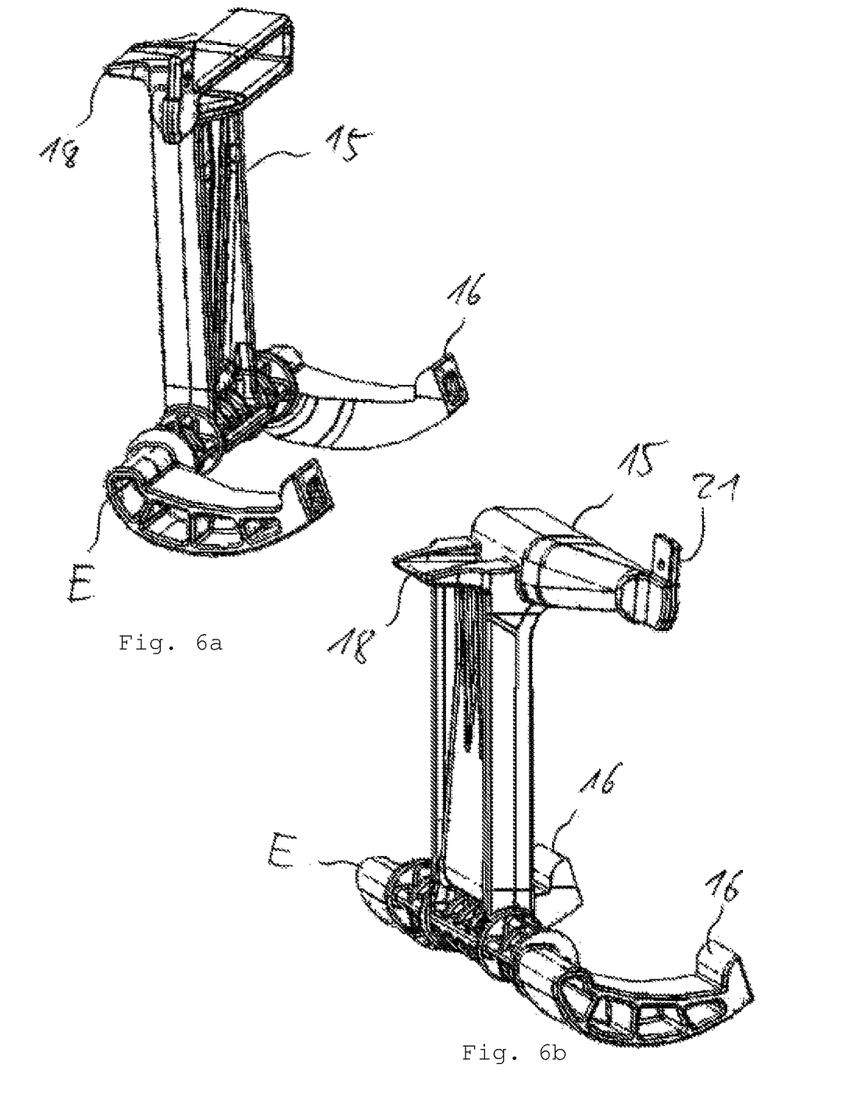
Figure 7:
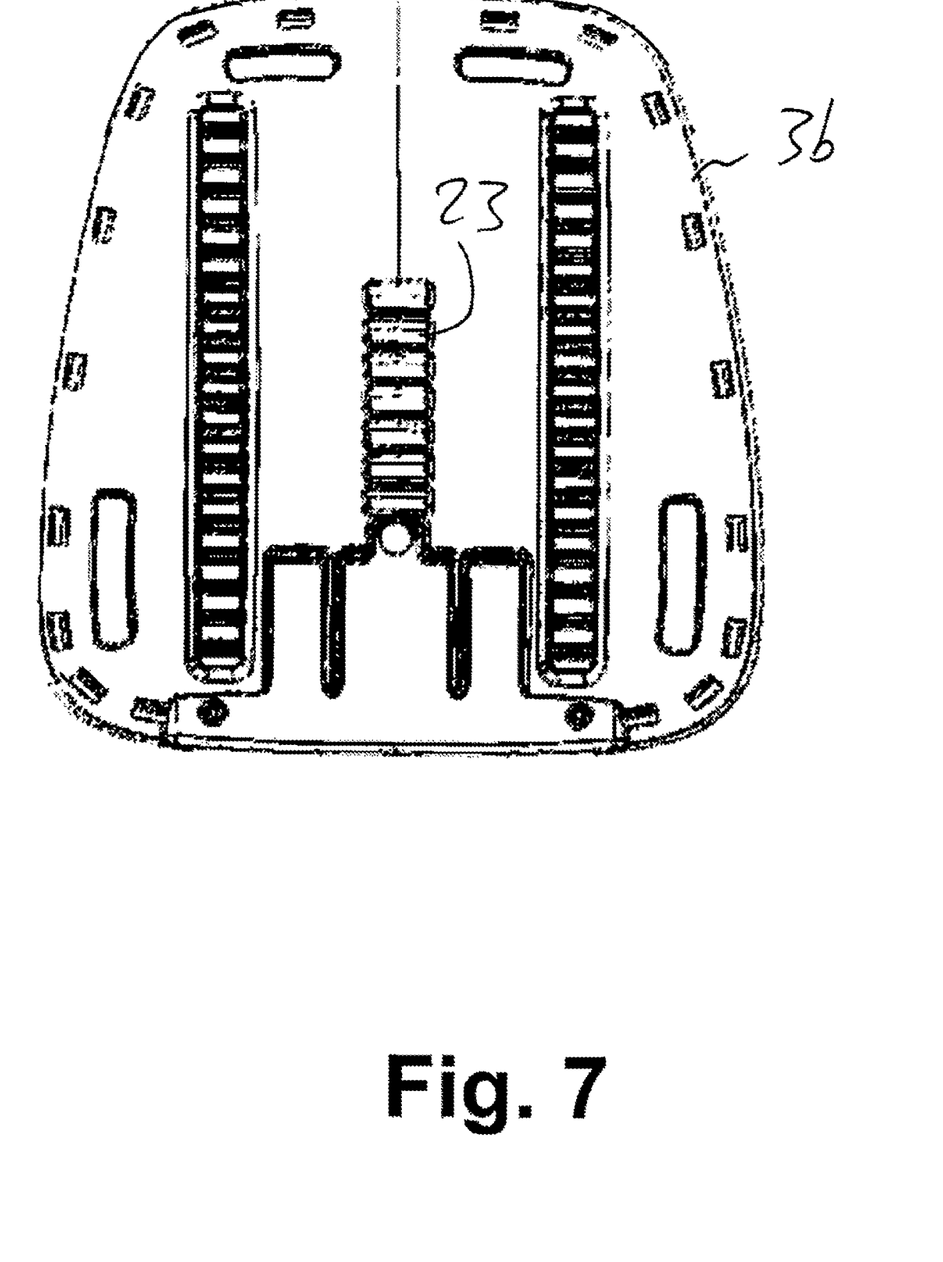
FIG. 7 is an elevation view of a headrest support.

A locking device 14 is provided for locking the adjusting apparatus 4 and is shown in FIGS. 4-6. The locking device 14 has a pivotable locking element 15 which is attached to the guide device 8 and which allows locking to the four-joint system 9, for example to a link 10, 12, and further allows locking to the head cushion support 3b. Here, the locking element 15 is provided on the guide device 8 such that it may pivot, for example in a pivot axis E. In this case, the handle 5 is, for example, a lever which may pivot forward, and which is mounted, for example, in a pivot joint 5a on the guide device 8 and furthermore directly pivots the locking element 15 by way of an inner lever arm 5b. The locking element 15 has, in its lower region, a longitudinal engagement means 16 which is, for example, a rear tooth which engages into a mating engagement means 10b of one of the links 10, 12. The mating engagement means 10b may be, for example, in the form of a tooth recess here.

Figure 8:
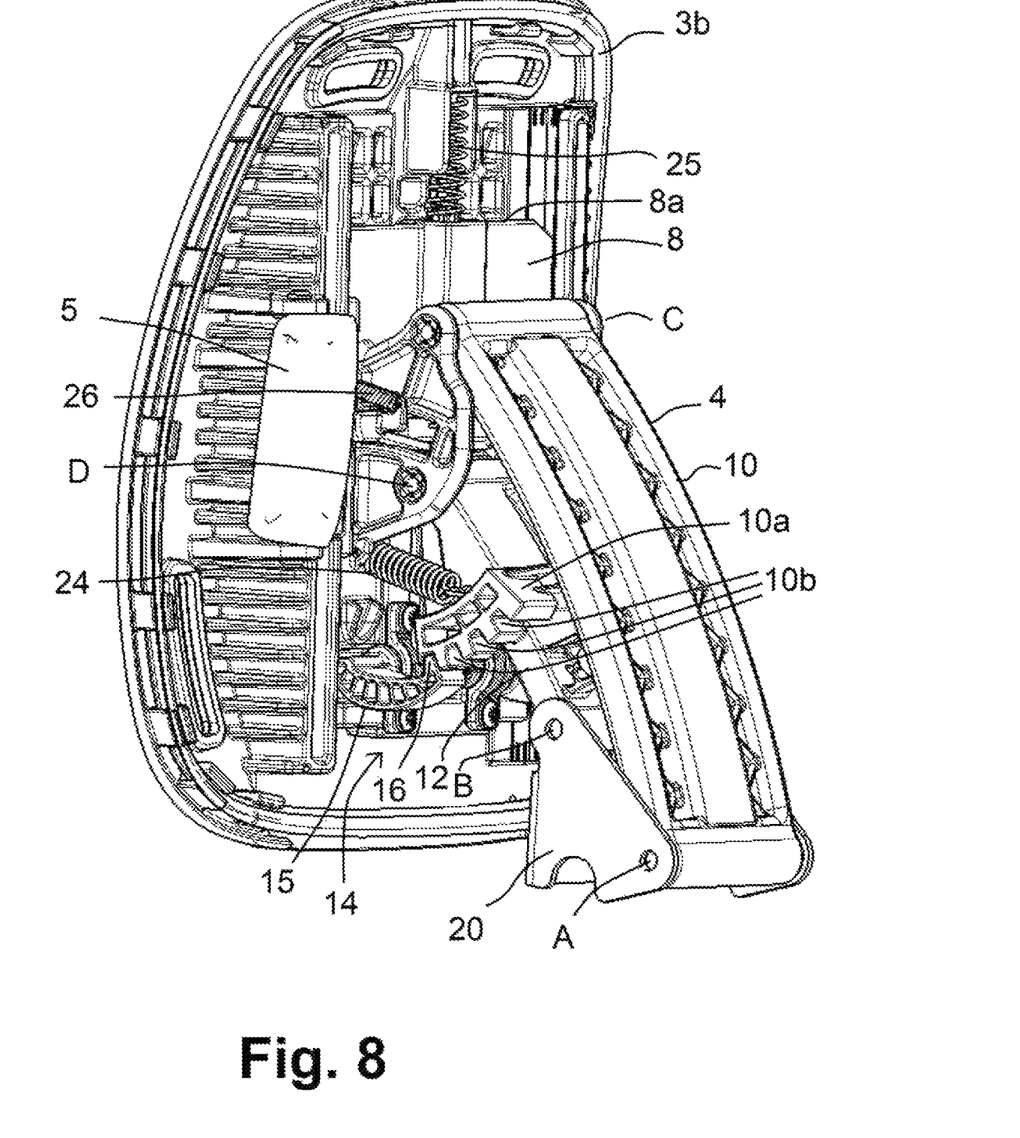
FIG. 8 is an enlarged perspective view of FIG. 2b.

In the illustrative embodiment shown, the mating engagement means for the longitudinal adjustment, that is to say the tooth recesses 10b, is formed on the rear link 10, for which reason the rear link 10 is designed here with a locking projection 10a which extends in the Y direction and which has formed on its bottom side the tooth recesses 10b, for example between raised tooth portions. As shown in FIG. 8, a plurality of tooth recesses 10b may be formed as mating engagement means on the locking projection, so that the longitudinal engagement means 16 may selectively engage into one of the tooth recesses 10b. By virtue of operating the handle 5, the locking element 15 is pivoted downward and forward by way of its lower region, so that the longitudinal engagement means 16, which is in the form of a locking tooth, is pivoted out of the respective tooth recess 10b, so that the engagement means for the longitudinal adjustment moves out of the mating engagement means and longitudinal adjustment is then enabled: the two links 10 and 12 are freely adjustable.

Furthermore, the vertical locking arrangement is also formed on the locking element 15, for which reason said vertical locking arrangement has a vertical engagement means 18 on an upper region, which vertical engagement means protrudes forward through a clearance in the guide device 8 as shown in FIG. 5. When the locking element 15 is pivoted, the upper region containing the one vertical engagement means 18 is rearward and moves rearward out of its holder 23 in the headrest support 3b, as a result of which the headrest support 3b, which was locked up to this point, is released.

In the illustrative embodiment, the headrest support 3b is subsequently freely adjustable in its vertical guide rail 8a (guide rail or vertical guide for the headrest 3) up to the respective upper and lower stops.

The handle 5 may be, in particular, grasped and pulled forward for unlocking purposes; it is mounted, for example, in a pivot joint 5a on the guide device 8, so that an inner lever arm 5b accordingly pivoted rearward and guides therefore pivots the locking element 15, which is held by it, rearward.

The adjusting apparatus 4 is pretensioned by spring devices. Here, the pretensioning operations in the X and Z direction and the pretensioning of the locking device 14 and its handle are separate.

A first spring 24 for pretensioning in the X direction may be provided, for example, between the guide device 8 and a link, for example the rear link 10. Here, the first spring 24 may be suspended, for example, from the locking projection 10a of the rear link 10. The first spring 24 pulls the guide device 8 rearward.

A second spring 25 for vertical pretensioning is provided between the headrest support 3b and the guide device 8 and acts, for example, downward on the headrest support 3b in order to assist the seat occupant during adjustment.

A third spring 26 pretensions the adjusting apparatus 4 in its locking position. The third spring 26 may be provided, as shown in FIG. 4 for example, between the handle 5 and the guide device 8, or else, for example, between the locking element 15 and the guide device 8.

In the illustrative embodiment, the user may grasp the handle 5 at its outer region using his left hand and pull said handle forward, as a result of which the locking element is adjusted into its unlocking position, so that the user may then position the headrest in the X and Z directions using his right hand, until he releases the handle 5 and the locking device 4 locks again.

Illustratively, the present disclosure relates to an adjusting apparatus for a headrest of a vehicle seat, and to a vehicle seat of this kind. Adjusting apparatuses of this kind may allow the headrest to be adjusted in relation to the backrest and therefore allow the headrest to be adapted to the seat occupant.

Illustratively, adjusting apparatuses may allow vertical adjustment of the headrest in relation to the backrest, that is to say adjustment in the vertical direction or Z direction. Furthermore, adjusting apparatuses may allow longitudinal adjustment or X direction, in the case of which the headrest may therefore be adjusted forward relative to the backrest. The seat occupant may therefore respectively adapt both adjustment arrangements, for example by respectively unlocking a locking device and setting the two directions.

Illustratively, the present disclosure is based on the object of providing an adjusting apparatus for a headrest and providing a vehicle seat including an adjusting apparatus of this kind, which adjusting apparatus and vehicle seat may allow reliable adjustment together with simple operator control. Therefore, a guide device is provided, which guide device holds a headrest support in a vertically adjustable manner, as a result of which Z adjustment is possible. The X adjustment arrangement or longitudinal adjustment arrangement adjusts the guide device in relation to a backrest connection.

A locking device is further provided, which locking device locks the two adjustment arrangements—the X adjustment arrangement and the Z adjustment arrangement. Unlocking is performed by means of a common, single handle which may be operated by the user, for example by said user pulling said handle forward. Unified unlocking operation of the handle is made possible in this way; the seat occupant operates the handle and in this way unlocks the two locking arrangements, so that said seat occupant may then set both the X position and also the Z position.

The longitudinal adjustment arrangement may be formed with two links which are respectively directly or indirectly connected in an articulated manner to a lower link in the backrest connection and to an upper link on the side device. When the common handle is operated, both the X direction and also the Z direction are released, so that the user may adjust the head position in both directions—X and Z directions—and in this way may directly set a more comfortable position, without the two adjustment operations having to be carried out in succession. Therefore, the user may grasp the head cushion and pull it, for example, downward and forward, in a single movement. Locking in the desired position may be performed, in turn, by releasing the handle. Therefore, operator control which may be simple and intuitively easy to remember is possible, with simple adjustment of the head cushion without additional elements or devices having to be operated or adjusted.

The locking device may have one or more locking elements, with a longitudinal engagement means, which engages in the suitable longitudinal position, and furthermore with a vertical engagement means which defines the vertical position. The two engagement means are disengaged in the unlocking position, so that free adjustability may be possible. This may provide a simple design and may allow free adjustment, that is to say even without the use of a gear mechanism, for example. Therefore, according to a preferred embodiment, the adjustment operations in the X and Z directions may be unlocked simultaneously or at the same time when the common handle is operated.

According to an illustrative embodiment, the longitudinal engagement means and vertical engagement means are formed on the same locking element so that a common locking element is adjusted for both unlocking operations.

The longitudinal engagement means and vertical engagement means may be designed to be physically separate, for example on an upper region and lower region of the locking element. Therefore, a pivoting movement of the locking element, which pivoting movement adjusts the two engagement means differently, for example adjusts the longitudinal engagement means in the vertical direction and the vertical engagement means in the longitudinal direction, may be set.

The locking element may be pivotably mounted on the guide device, so that it allows locking of the longitudinal adjustment arrangement and of the headrest support in relation to the guide device; a relatively high degree of stability may be achieved in this way.

The longitudinal engagement means engages into the longitudinal adjustment arrangement, into one of the links, as a result of which secure mechanical locking of the four-joint system is possible. In the process, longitudinal engagement of the locking element may take place, for example, from bottom to top, as a result of which secure locking in the longitudinal direction is possible; therefore, the locking element is pivoted away downward in order to enable longitudinal engagement.

Vertical engagement may take place in the forward direction through a clearance in the guide device so that the headrest support may be directly blocked. Therefore, a locking device of relatively simple construction which allows both longitudinal engagement and also vertical engagement and releases the two locking arrangements by virtue of a single unlocking movement may be formed.

The handle may have, for example, a grip or the like which protrudes laterally from the adjusting apparatus and therefore may be grasped by the user laterally next to his head, and is pulled forward for unlocking purposes, for example. As a result, the locking element is, for example, pivoted in such a way that it enables longitudinal engagement and vertical engagement, so that the user may then position the headrest in the X and Z directions, for example using his other hand, and he may then release the handle.

The locking arrangements may be discrete or in discrete positions, as a result of which a relatively high degree of stiffness and, respectively, more secure engagement may be possible. To this end, the longitudinal engagement means may have a projecting tooth which engages into suitable mating engagement means, for example recesses in the longitudinal adjustment arrangement such as, for example, into recesses in one of the links. The vertical engagement means may engage, for example, into different windows in the headrest support The longitudinal adjustment arrangement with links may form a four-joint system or four-joint mechanism. In this case, the links may be connected in an articulated manner by way of their lower joints in a backrest connection and in their upper joints to the guide device preferably form a four-joint system with about one degree of freedom. This may allow rattle-free and secure adjustment or forced guidance of the guide device in relation to the backrest connection. An embodiment of this kind with a front link and a rear link, which links may each be formed, for example, with a suitable width and strut arrangement, furthermore also provides a relatively high degree of safety and strength.

In illustrative embodiments, the two links may not form a parallel guide linkage or parallelogram, but rather may be of unequal length. A relatively high degree of stiffness or strength may be achieved and nevertheless the adjustment may not be uncomfortable owing to links of unequal design in this way; therefore, the four-joint system may, for example, pivot the guide device forward and furthermore somewhat downward during the pivoting movement; since the user adjusts the headrest in the vertical direction anyway, he may not consider this slight downward pivoting movement to be relevant. A four-joint system of this kind with a relatively high degree of stiffness may be designed as a parallel guide linkage for example. In this case, a relatively high degree of stiffness may also achieved by the rear link being longer. In other embodiments, the longitudinal adjustment arrangement may include links which form a parallelogram adjustment arrangement or parallel guide linkage.

The rear lower joint may be formed below the front lower joint of the front link, furthermore, the rear upper joints of the rear link may be arranged above the front upper joint of the front link, as a result of which a relatively stiff and compact construction may be possible.

The adjusting apparatus may be supported by suitable spring devices. Therefore, a spring for pretensioning the longitudinal adjustment arrangement may be provided, for example, between the guide device and the longitudinal adjustment arrangement, for example one of the links, and, for example, a further spring for pretensioning the vertical adjustment arrangement may be provided between, for example, the guide device and the headrest support. The locking device may be pretensioned in relation to, for example, the guide device by a spring.

The invention claimed is:

1. An adjusting apparatus for a headrest of a vehicle seat, the adjusting apparatus comprising
   a guide device for guiding a headrest support in a vertical direction,
   a backrest connection for attachment to a backrest,
   a longitudinal adjustment arrangement for adjusting the guide device in the longitudinal direction,
   a locking device for locking the adjusting apparatus in both the longitudinal direction and the vertical direction, and
   a handle for unlocking the locking device to an unlocking position in which the locking device releases the longitudinal adjustment arrangement in the longitudinal direction and the vertical adjustment arrangement in the vertical direction,
   wherein the headrest support is a held headrest support and is configured to be locked in a vertical position by the locking device.

2. The adjusting apparatus of claim 1, wherein the held headrest support is configured to be adjusted in the vertical position and in the longitudinal position in the unlocking position.

3. The adjusting apparatus of claim 1, wherein the longitudinal adjustment arrangement includes
   a rear link which is pivotably connected in an articulated manner to the backrest connection in a rear lower joint and to the guide device in a rear upper joint, and
   a front link which is pivotably connected in an articulated manner to the backrest connection in a front lower joint and to the guide device in a front upper link, and
   wherein a longitudinal position of the guide device is configured to be adjusted with pivoting of the guide device forward and downward, by pivoting the links.

4. The adjusting apparatus of claim 2, wherein the longitudinal adjustment arrangement includes:
   a rear link which is pivotably connected in an articulated manner to the backrest connection in a rear lower joint and to the guide device in a rear upper joint, and
   a front link which is pivotably connected in an articulated manner to the backrest connection in a front lower joint and to the guide device in a front upper link, and
   wherein a longitudinal position of the guide device is configured to be adjusted by pivoting the links.

5. The adjusting apparatus of claim 1, wherein the locking device includes a locking element which has a longitudinal engagement means for defining the longitudinal position of the guide device in the longitudinal direction and a vertical engagement means for defining the vertical position of the headrest support in the vertical direction, and
   wherein the longitudinal engagement means and the vertical engagement means are disengaged when the locking device is adjusted to its unlocking position.

6. The adjusting apparatus of claim 5, wherein the longitudinal engagement means is formed on a lower region of the locking element and the vertical engagement means is formed on an upper region of the locking element, and the locking element, when it is adjusted to its unlocking position, is pivoted downward by way of its lower region and rearward by way of its upper region.

7. The adjusting apparatus of claim 1, wherein the handle has a pivotable lever arm with a pivot bearing in the guide device.

8. The adjusting apparatus of claim 1, wherein the handle is configured to be pivoted into the unlocking position against a spring force of a spring device.

9. The adjusting apparatus of claim 1, wherein a distance between the upper joints is fixed and a distance between the lower joints is fixed.

10. The adjusting apparatus of claim 9, wherein the links, the guide device and the backrest connection form a four-joint mechanism with about one degree of freedom for longitudinally adjusting the guide device in relation to the backrest connection by adjustment in the joints.

11. The adjusting apparatus of claim 1, wherein the rear link is longer than the front link, wherein the rear lower joint is arranged below the front lower joint, and the rear upper joint is arranged above the front upper joint.

* * * * *